United States Patent

Hawkins et al.

[11] Patent Number: 5,925,081
[45] Date of Patent: Jul. 20, 1999

[54] SYSTEM AND METHOD FOR MANAGING ACCESS TO A LOAD RESOURCE HAVING A LOADING MACHINE

[75] Inventors: Mark R. Hawkins, Chillicothe; Carl A. Kemner; Craig L. Koehrsen, both of Peoria; Joel L. Peterson, East Peoria, all of Ill.

[73] Assignee: Caterpillar Inc., Peoria, Ill.

[21] Appl. No.: 08/774,942

[22] Filed: Dec. 19, 1996

[51] Int. Cl.⁶ ............................. G05D 1/00; G01C 22/00
[52] U.S. Cl. ................................ 701/24; 701/24; 701/50
[58] Field of Search ................... 701/24, 25, 26, 701/23, 50, 200, 205; 340/988, 989, 909; 180/167, 168, 169; 318/587

[56] References Cited

U.S. PATENT DOCUMENTS

| | | | |
|---|---|---|---|
| 4,950,118 | 8/1990 | Mueller et al. | 414/274 |
| 5,390,125 | 2/1995 | Sennott et al. | 364/449 |
| 5,445,347 | 8/1995 | Ng | 246/169 |
| 5,546,093 | 8/1996 | Gudat et al. | 342/357 |
| 5,586,030 | 12/1996 | Kemner et al. | 701/23 |
| 5,646,844 | 7/1997 | Gudat et al. | 701/208 |
| 5,742,915 | 4/1998 | Stafford | 701/35 |
| 5,752,207 | 5/1998 | Sarangapani | 701/26 |
| 5,787,378 | 7/1998 | Schricker | 701/50 |
| 5,806,016 | 9/1998 | Henderson et al. | 701/207 |

OTHER PUBLICATIONS

"Method and Apparatus for Determining a Path for a Machine Between a Predetermined Route and a Final Position", Appln. No. 08/536,761, Filed Sep. 29, 1995.

Primary Examiner—William A. Cuchlinski, Jr.
Assistant Examiner—Tim Wyckoff
Attorney, Agent, or Firm—W. Bryan McPherson, III

[57] ABSTRACT

A system and method for managing access of at least one mobile machine to a load resource having a loading machine including a queue manager adapted to deliver a queue position request signal, a resource manager adapted to control access to the load resource, and a load manager adapted to determine a load point for a mobile machine.

35 Claims, 4 Drawing Sheets

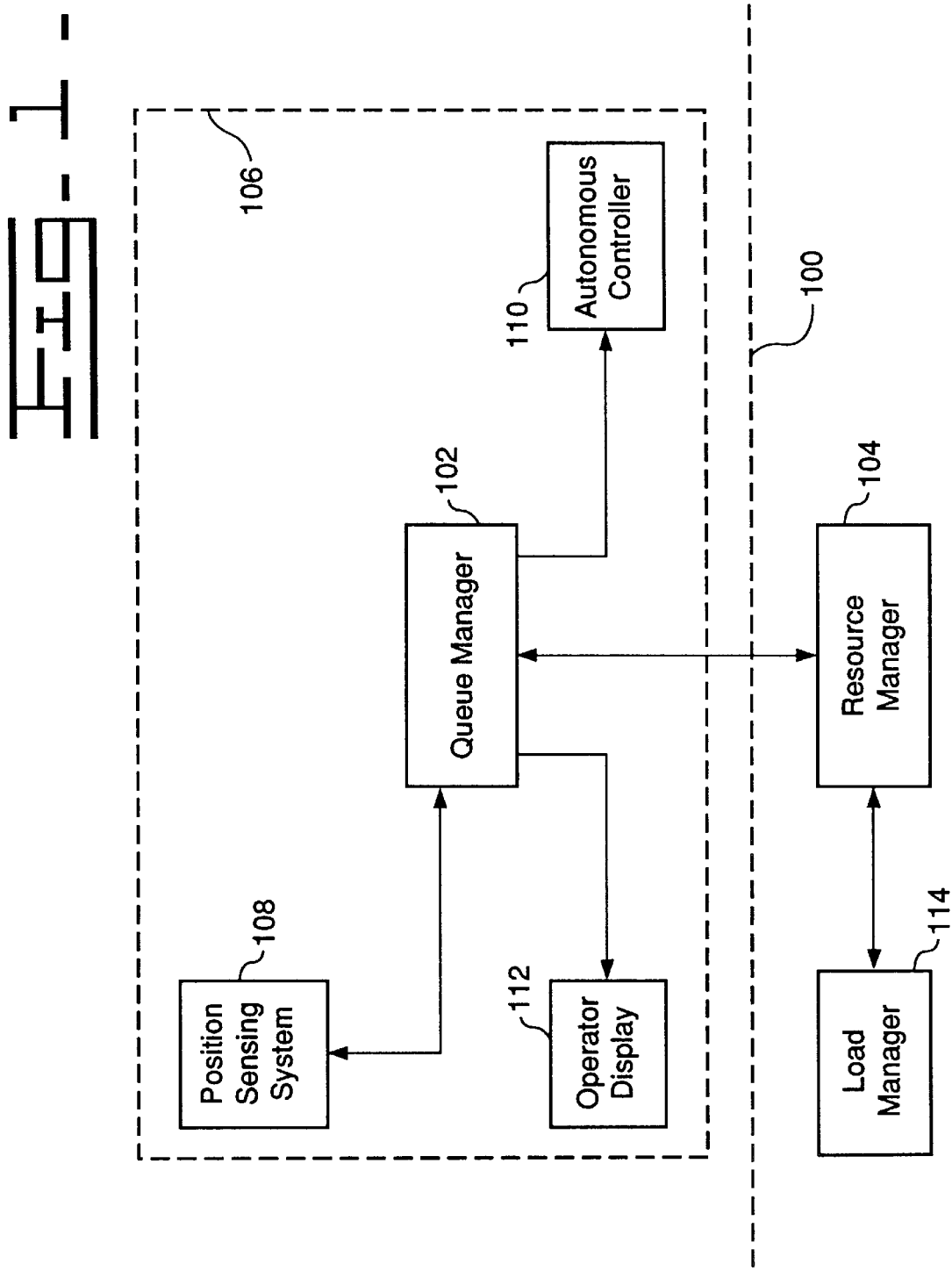

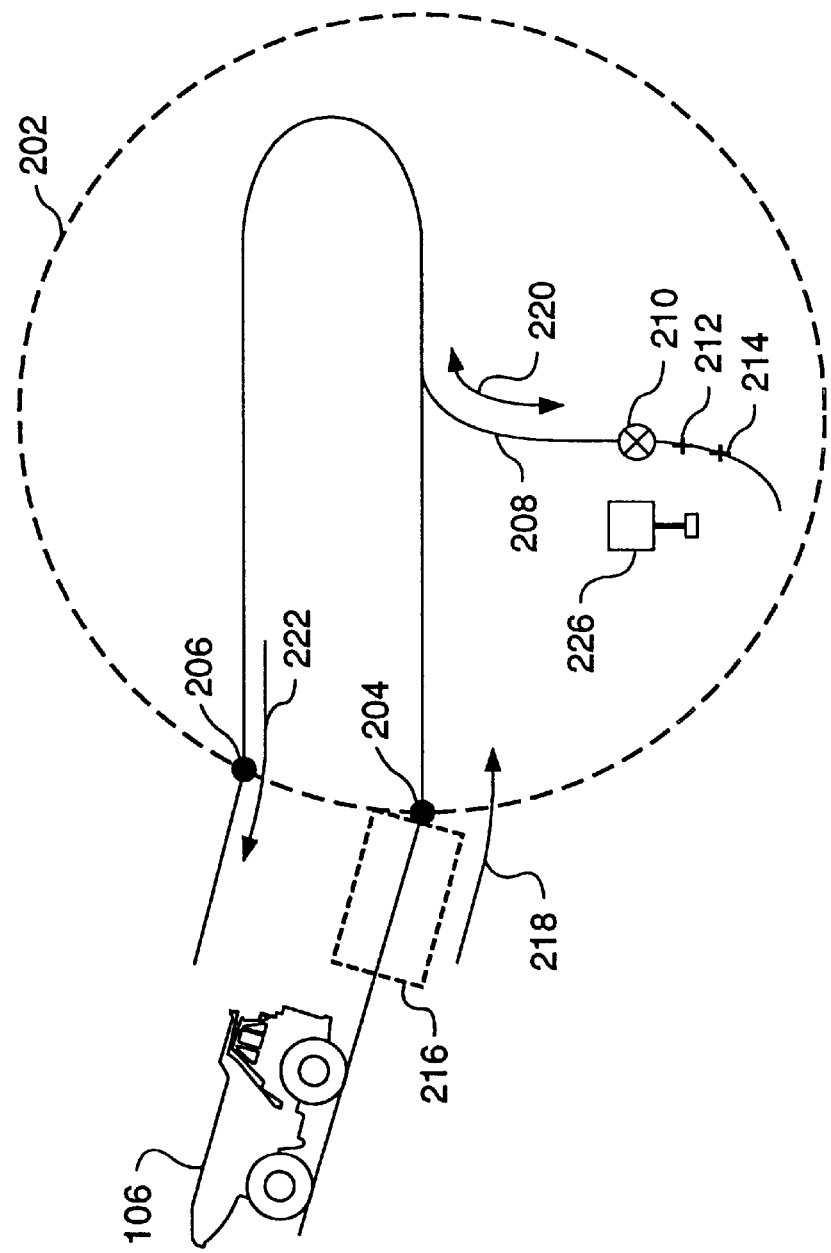

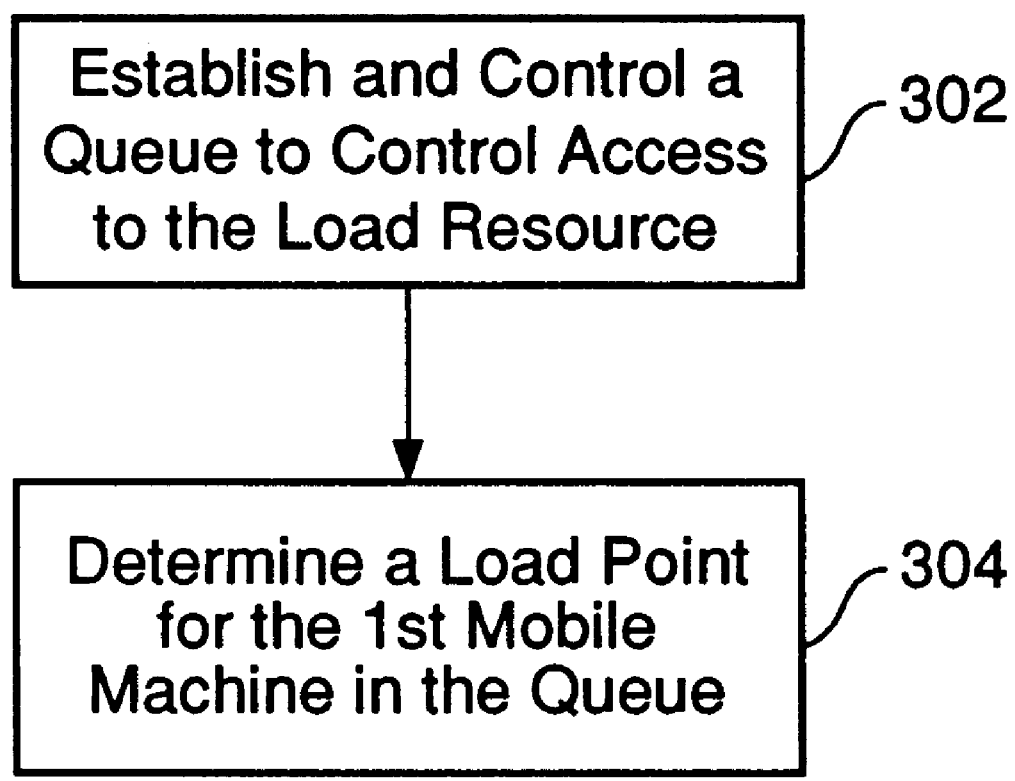
Fig_3_

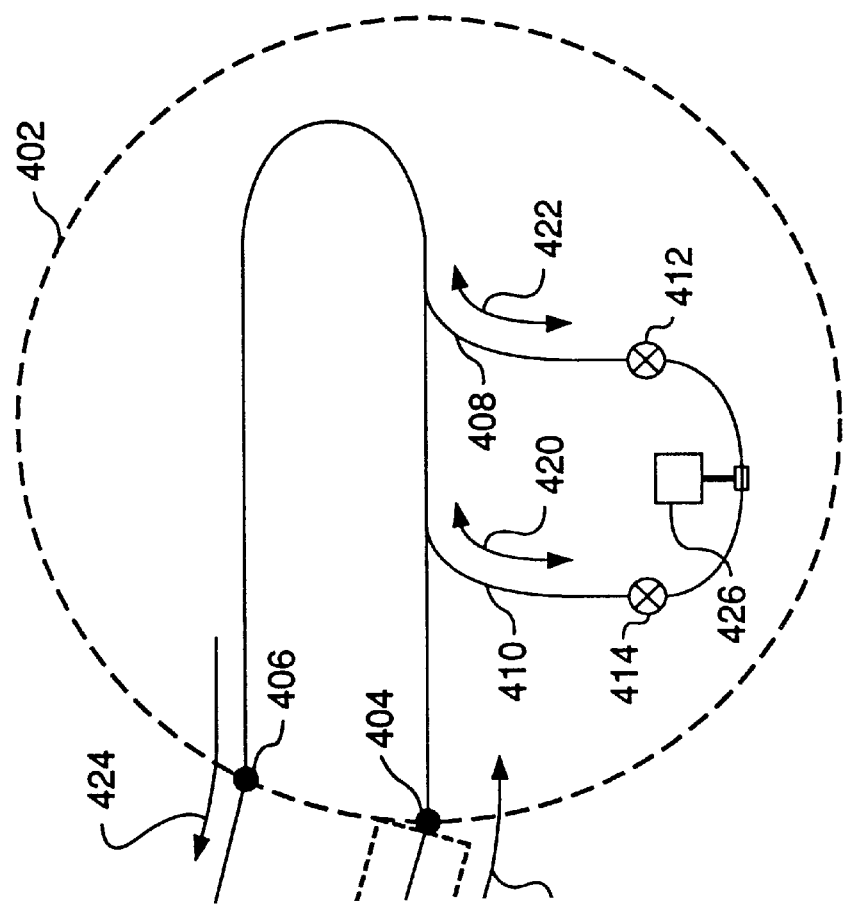

SYSTEM AND METHOD FOR MANAGING ACCESS TO A LOAD RESOURCE HAVING A LOADING MACHINE

TECHNICAL FIELD

This invention relates generally to a system and method for managing a resource in a mobile machine system and, more particularly, to a system and method for managing access to a load resource having a loading machine such as a shovel loader.

BACKGROUND ART

Caterpillar Inc. of Peoria, Ill., manufactures off-road mining mobile machines. For example, the Caterpillar 777C is an off-road mining truck. In commonly owned U.S. Pat. No. 5,390,125, Kyrtsos et al disclose an autonomous mobile machine system for use with a mining mobile machine such as the 777C truck. Such a n autonomous mobile machine system may be used, for example, to implement an autonomous mining operation. For example, a plurality of autonomous dump trucks can haul rock from an excavation site to a crusher site in an open pit mining operation.

Commonly owned U.S. patent appl. No 08/536,761, filed Sep. 29, 1995, "Method and Apparatus for Determining a Path for a Machine Between a Predetermined Route and a Final Position" discloses an apparatus and method for automatically determining and modeling a path between a route and a final position. Such a mobile machine method and system may be used to implement a mobile machine mining operation. For example, a plurality of autonomous dump trucks can haul rock from an excavation site to a crusher site in an open pit mining operation using this system to plan a path to a final position.

In addition, in commonly owned U.S. Pat. No. 5,586,030, Kemner et al disclose a system using a queuing technique to manage a single input, fixed position resource. However, in a mining system, there are resources such as shovel loaders, which are not fixed position resources. For example, in a load resource having a shovel loader, the position of the loader and the location of the load point may change. When the load point changes, mobile machines must be informed of the new load point. In addition, when the position of the shovel loader changes, the route required to reach the new load point may change.

The present invention is directed to overcoming one or more of the problems as set forth above.

DISCLOSURE OF THE INVENTION

In one aspect of the present invention, a system for managing a load resource shared by a plurality of mobile machines is provided. The load resource has a loading machine. The system includes a queue manager on each mobile machine for generating a queue position request signal. The system also includes a resource manager which establishes and controls a queue to control access to the load resource. The system includes a load manager to determine a load point for the mobile machine.

In another aspect of the present invention, a method for managing a load resource having a loading machine, an entry point, and an exit point is provided. The resource is shared by a plurality of mobile machines. The method includes the steps of establishing and controlling a queue to control access to the load resource, and determining a load point for a mobile machine in a first queue position.

BRIEF DESCRIPTION OF THE DRAWINGS

FIG. 1 is a high level block diagram illustrating an embodiment of the present invention;

FIG. 2 is a diagrammatic illustration of an embodiment of the present invention;

FIG. 3 is a high level flow diagram illustrating a method of the present invention; and FIG. 4 is a diagrammatic illustration of another embodiment of the present invention.

BEST MODE FOR CARRYING OUT THE INVENTION

With reference to FIGS. 1 and 2, the present invention provides a system 100 for managing a load resource 202 shared by at least one mobile machine 106. The load resource 202 includes a loading machine 226. The loading machine 226 has a load manager 114 which determines a load point 210 based on a configuration of the load resource 202 and a condition of the loading machine 226. In the preferred embodiment, the load resource 202 is an electric shovel loader. However, other types of loading machines, e.g., hydraulic shovel loaders, wheel loaders, track loaders, etc. may be used without deviating from the spirit of the invention.

A queue manager 102 is located on each mobile machine 106. The queue manager 102 generates a queue position request signal when the mobile machine 106 approaches the load resource 202.

A resource manager 104 establishes and controls a queue to control access to the load resource 202. The resource manager 104 receives the queue position request signal and responsively determines a queue position in the queue 216 for the approaching mobile machine 106. The load manager 114 is located on the loading machine 226. The load manager 114 determines the load point 210 for the mobile machine 106 located in the first position of the queue 216. The load point 210 is based on the configuration of the load resource 202, and the condition of the loading machine 226, as is described below.

A position sensing system 108 determines the position of a predetermined point on the mobile machine 106. The position sensing system 108 may include a Global Positioning System (GPS), a laser positioning system, an inertial navigation unit, or any suitable system or combination thereof.

The system 100 may operate in an autonomous or manual mode. In the autonomous system embodiment, an autonomous controller 110 receives signals from the position sensing system 108 and the queue manager 102 and autonomously operates the mobile machine 106 along a predetermined path. In the manual system embodiment, an operator display 112 displays information to assist an operator during operation of the mobile machine 106.

In the preferred embodiment, the load resource 202 has a loading machine 226 such as an electric shovel loader, or hydraulic shovel loader. The resource manager 104 controls the flow of mobile machines 106, such as dump trucks, through the load resources at a work site such as an open pit mining site. The resource manager 104 acts like a supervisor, controlling access to the load resource 202, and tracking the progress of the mobile machines 106 as they pass through the load resource 202. In the preferred embodiment, the resource manager 104 is located at a base station (not shown) near an open pit mining operation, and is a general purpose computer or workstation. The features of the resource manager 104 are embodied in software programmed into the computer.

With reference to FIG. 2 in the preferred embodiment, the load resource 202 includes a loading machine 226, and the load manager 114 is located on the load machine 226, e.g., an electric shovel. The load resource 202 has one entry point 204, one exit point 206, at least one load row 208, and at least one load point 210 for each load row 208. Arrows 218,220,222 indicate the direction of travel of mobile machines 106 through the load resource 202. New load points 212,214 are determined based on the configuration of the load resource 202 and the current condition or position of the loading machine 226.

The resource manager 104 establishes a queue 216 for the entry point 204 to the load resource 202. As mobile machines 106 approach the load resource 202, the resource manager 104 assigns them a position within the queue 216.

When the loading machine 226 is ready to receive a mobile machine 106, the load manager 114 calculates a load point 210 for the mobile machine 106. The load point 210 is the location, e.g., heading and position, desired by the loading machine 226 for the mobile machine 106 to be located for loading. The load point 210 is updated based on the current configuration of the load resource 202 and the condition of the loading machine 226. For example, in the preferred embodiment, the loading machine 226 will periodically change its location and orientation in order to collect the load material. This change in location and orientation dictates a change in the location of the load point 210 for efficient loading of the mobile machines 106.

After updating the load point 210 to a first new load point 212, the load manager 114 communicates the first new load point 212 to the resource manager 104. The resource manager 104 responsively communicates the first new load point 212 to the mobile machine 106 in the first position of the queue 216. The load manager 114 then determines when the load row 208 is clear. When the load row 208 is clear, the resource manager 104 permits the first mobile machine 106 in the queue 216 to proceed to the first new load point 212. The timing of the load row access is important to ensure that multiple mobile machines 106 do not conflict with each other as they move through the load resource 202. The resource manager 104 determines the load row 208 is clear by tracking the progress of the mobile machines as they proceed through the load resource 202. After permitting a mobile machine 106 to proceed, the resource manager 104 tracks the progress of the mobile machine 106 through the load resource 202. The mobile machine 106 will send a signal to the resource manager 104 when it arrives at the loading machine 226. The resource manager 104 will then notify the loading machine 226 that it can begin loading. Once the loading machine 226 has completed loading the mobile machine 106, the loading machine 226 will send a message to the resource manager 104 indicating the loading of mobile machine 106 has been completed. The resource manager 104 will then notify the mobile machine 106 to leave the load resource 202. Once the mobile machine 106 has left the load resource 202, the resource manager 104 selects the next appropriate mobile machine 106 in the queue 216 to allow access to the loading machine 226.

A method of managing a load resource 202, according to one embodiment of the present invention, is illustrated in FIG. 3. In a first control block 302, the resource manager 104 establishes and controls a queue 216, corresponding to the entry point 204, in order to control access to the load resource 202. In a second control block 304, the load manager 114 determines a load point 210 for the first mobile machine 106 in the queue 216. This load point 210 is determined based on the configuration of the load resource 202, and on a condition of the loading machine 226.

INDUSTRIAL APPLICABILITY

With reference to the drawings and in operation, the present invention provides a system and method for managing access to a load resource 202 having a loading machine 226 such as an electric shovel loader. In the preferred embodiment, during initialization, the resource manager 104 accesses a database containing the information regarding the configuration of the load resource 202. For example, referring again to FIG. 2, the resource manager 104 determines the load resource 202 contains one electric shovel loader, e.g., the loading machine 226, one entry point 204, one exit point 206, one load row 208, and one load point 210 for the load row 208. Based on this information, the resource manager 104 establishes a queue 216 for the entry point 204. As a mobile machine 106 approaches the load resource 202, the queue manager 102 sends a queue position request signal to the resource manager 104. The resource manager 104 will determine and send a queue position signal to the mobile machine 106. The queue position signal will contain information concerning the physical location of the first position in the queue 216, e.g., the entry point 204 in the queue 216, and the number of mobile machines currently in the queue 216, e.g., zero. The queue manager 102 on the mobile machine 106 will use the information contained in the queue position signal to determine where to stop the mobile machine 106 to await further instructions from the resource manager 104.

When the loading machine 226 is ready to receive a mobile machine 106, the load manager 114 determines the load point 210 for the mobile machine 106 to be located. This load point 210 is determined based on the position and orientation of the loading machine 226. Once a load point 210 has been determined, the load manager 114 will send a request for a mobile machine 106 to the resource manager 104. This request will include the location of the load point 210, and the desired orientation of the mobile machine 106 at the load point 210. In response to receiving the request for a mobile machine 106, the resource manager 104 will determine a route to the load point 210. This route will be dictated in part by the configuration of the loading machine 226, e.g., the location and orientation of the loading machine 226, and the location of any support equipment, such as power lines used by an electric shovel. Once the route, which includes the load row 208, is determined, the resource manager 104 will check to see if the route to the load point 210 is clear. Once the route is determined to be clear, the resource manager 104 will send a depart position signal to the first mobile machine 106 in the queue 216. This depart position signal will include the load point 210, and the route to get to the load point 210. After receiving the depart position signal, the mobile machine 106 will leave the queue 216 and travel to the load point 210, sending a leave position signal to the resource manager 104. Once the resource manager 104 receives the leave position signal from the mobile machine 106, it updates the positions of any remaining mobile machines in the queue 216. After arriving at the load point 210, the mobile machine 106 sends an arrive load point signal to the resource manager 104. This arrive load point signal may contain data indicating the actual location of the mobile machine 106. The resource manager 104 then sends a load mobile machine ready signal to the load manager 114 to indicate the mobile machine 106 is ready for loading.

Once the loading machine 226 has completed loading, the load manager 114 sends a loading complete signal to the resource manager 104. The resource manager 104 then sends a depart load point signal to the mobile machine 106. The depart load point signal commands the mobile machine 106 to leave the load point 210 and the load resource 202. After receiving the depart load point signal, the mobile machine 106 leaves the load point 210, and sends a leave load point signal to the resource manager 104. Once the mobile machine 106 has left the load resource 202 it sends a leave load resource signal to the resource manager 104. When the loading machine 226 is ready to load another mobile machine 106, the load manager 114 determines a first new load point 212 and sends a request to the resource manager 104 to send a mobile machine 106 to the first new load point 212.

The present invention may be used to manage load resources with more complex configurations. For example, the load resource 402 of FIG. 4 has a first and second load row 420,422, and a respective first and second load point 412,414. The load resource 402 also has an entry point 404, an exit point 406, and a queue 416. Arrows 418,420,422,424 indicate the direction of travel through the load resource 402. The configuration of the load resource 402 will enable multiple mobile machines to simultaneously access the first and second load points 412,414 as long as their routes to and from the first and second load points 412,414 do not conflict with each other.

Complex load resource configurations may require the resource manager 104 to use a route planner to determine the route to and from the load points 412,414. While the invention has been particularly shown and described with reference to several preferred embodiments thereof, it will be understood by those skilled in the art that various changes in form and details may be made therein without departing from the spirit and scope of the invention.

Other aspects, objects, and features of the present invention can be obtained from a study of the drawings, the disclosure, and the appended claims.

What is claimed is:

1. A compressed air toy gun for firing projectiles comprising:

a launch tube adapted to hold a projectile, said launch tube having an end wall and an air opening extending through said end wall;

an air pump adapted to compress air;

a conduit in fluid communication with said air pump and said launch tube, said conduit having an exit end positioned adjacent said launch tube end wall; and an elastic seal mounted to said exit end of said conduit, said seal having an opening therethrough generally aligned with said air opening of said launch tube end wall and having an outer surface facing said launch tube end wall, said seal being adapted to be stretched between a relaxed position generally separated from said launch tube end wall and a stretched position wherein said elastic seal is bellowed to a position wherein said outer surface is in contact with said launch tube end wall about said end wall air opening.

2. A system, as set forth in claim 1, wherein said resource manager is adapted to provide communications between said resource manager and said load manager.

3. A system, as set forth in claim 1, wherein said resource manager is adapted to determine a queue position in response to receiving said queue position request signal and communicating said queue position to a mobile machine in a first position of said queue.

4. A system, as set forth in claim 1, wherein said resource manager is adapted to deliver a queue position signal to said approaching mobile machine, said queue position signal including data disclosing a position of said load resource and a number of mobile machines in said queue.

5. A system, as set forth in claim 4, wherein said queue manager is adapted to calculate said queue position from said position of load resource and said number of mobile machines in said queue.

6. A system, as set forth in claim 1, wherein said resource manager is adapted to determine a configuration of said load resource.

7. A system, as set forth in claim 1, wherein said load resource includes an entry point, said first load point, and an exit point.

8. A system, as set forth in claim 1, wherein said load resource includes a second load point.

9. A system, as set forth in claim 8, wherein said load manager is adapted to determine said second load point.

10. A system, as set forth in claim 8, wherein a first mobile machine and a second mobile machine simultaneously access said first load point and said second load point respectively.

11. A compressed air toy gun for firing projectiles comprising:

a launch tube adapted to hold a projectile, said launch tube having an air entry;

pressurized air supply means for supplying a quantity of pressurized air;

a conduit in fluid communication with said pressurized air supply means and said launch tube, said conduit having an exit end positioned adjacent said launch tube entry; and temporary sealing means for temporarily creating a seal between said conduit and said launch tube as air from said pressurized air supply means is conveyed through said conduit means into said launch tube, said temporary sealing means having an elastic member mounted to said exit end of said conduit, said elastic member having an opening therethrough generally aligned with said launch tube entry, said elastic member being adapted to be stretched between a relaxed position generally separated from said launch tube entry and a stretched position wherein said elastic member is bellowed to a position in contact with and about said launch tube entry.

12. A system, as set forth in claim 11, wherein said load manager is adapted to deliver said load point ready signal.

13. A system, as set forth in claim 1, wherein said resource manager is adapted to receive a loading complete signal from said load manager, and responsively deliver a depart load machine signal to a mobile machine located at said load point.

14. A system, as set forth in claim 1, wherein said load point includes a load point heading and position.

15. A system, as set forth in claim 14, wherein at least one of said resource manager and said load manager are adapted to determine a route from said queue to said load point.

16. A system, as set forth in claim 15, wherein said resource manager is adapted to communicate said route to said mobile machine in said first queue position.

17. A system, as set forth in claim 15, wherein at least one of said resource manager and said load manager includes a route planner for determining said route.

18. A system, as set forth in claim 1, wherein said resource manager is adapted to allow said mobile machine in said first position of said queue access to said load point in response to a condition of said load resource.

19. A system, as set forth in claim 1, wherein said load resource is a shovel loader.

20. A system, as set forth in claim 1, wherein said resource manager is adapted to selectively deliver a blocking signal to prevent mobile machines in said queue from accessing said load resource.

21. A compressed air toy gun for firing projectiles comprising:
- a launch tube adapted to hold a projectile, said launch tube having an air opening therethrough;
- a source of pressured air;
- a conduit in fluid communication with said source of pressurized air and said launch tube, said conduit having an exit end positioned adjacent said launch tube air opening; and
- an elastic seal mounted to said exit end of said conduit, said seal having an opening therethrough generally aligned with said air opening of said launch tube, said seal being adapted to be stretched between a relaxed position generally separated from said launch tube and a stretched position wherein said seal is bellowed to a position in contact with said launch tube about said air opening.

22. A method, as set forth in claim 21, wherein establishing and controlling said queue includes the step of controlling placement of said mobile machine in said queue in response to said mobile machine approaching said queue.

23. A method, as set forth in claim 21, including the step of communicating said load point to said mobile machine in said first queue position.

24. A method, as set forth in claim 21, including the step of determining said load resource configuration.

25. A method, as set forth in claim 21, including the step of determining the configuration of said load resource, said load resource having a first load point and a second load point.

26. A method, as set forth in claim 21, wherein controlling placement of said approaching mobile machine includes the steps of:
- receiving a queue position request signal from said approaching mobile machine;
- responsively determining a queue position in said queue; and
- communicating said queue position to said approaching mobile machine.

27. A method, as set forth in claim 26, wherein communicating said queue position includes the steps of:
- communicating an entry point position to said approaching mobile machine as a function of said queue and a determination of a number of mobile machines in said queue; and
- determining said queue position from said entry point position and said number of mobile machines in said queue.

28. A method, as set forth in claim 21, wherein controlling placement of said approaching mobile machine in said queue includes the step of responsively determining a queue position based on said load resource entry point and a number of other mobile machines in said queue.

29. A method, as set forth in claim 21, including the steps of:
- determining a route from said queue to said load point; and
- communicating said route to said mobile machine in said first queue position.

30. A method, as set forth in claim 21, including the step of allowing said mobile machine in said first position of said queue to access said load point in response to a condition of said load resource.

31. A method, as set forth in claim 30, including the steps of:
- communicating a depart position signal to said first mobile machine in response to determining to allow said queue to access said load point;
- receiving a leave position signal from said first mobile machine upon departure of said first mobile machine from said first position of said queue; and
- updating positions of any mobile machines remaining in said queue in response to receiving said leave position signal.

32. A method, as set forth in claim 21, including the steps of:
- receiving an arrive load point signal from said mobile machine; and
- communicating a load mobile machine ready signal to said load manager.

33. A method, as set forth in claim 21, including the steps of:
- receiving a loading complete signal from said load machine in response to completion of loading;
- responsively generating and communicating a depart load point signal to said mobile machine;
- receiving a leave load point signal from said mobile machine in response to said mobile machine leaving said load point; and
- receiving a leave load resource signal from said mobile machine in response to said mobile machine leaving said load resource.

34. A method, as set forth in claim 33 wherein responsively generating and communicating a depart load point signal to said mobile machine includes the step of determining a route to said exit point.

35. A method, as set forth in claim 25, including the step of enabling a first and second mobile machine to access said resource simultaneously.

* * * * *

UNITED STATES PATENT AND TRADEMARK OFFICE
CERTIFICATE OF CORRECTION

PATENT NO. : 5,925,081
DATED : July 20, 1999
INVENTOR(S) : Mark R. Hawkins, Carl A. Kemner, Craig L. Koehresen and Joel L. Peterson It is certified that error appears in the above-identified patent and that said Letters Patent is hereby corrected as shown below:

Claims 1, 11, and 21 of the subject patent should be deleted and claims 1, 11, and 21 of the prosecution history of the subject patent inserted as follows:

1. A system for managing at least one mobile machine at a load resource, the load resource including a loading machine, comprising:

a queue manager located on each of said at least one mobile machine, said queue manager being adapted to deliver a queue position request signal in response to approach of each of said at least one mobile machine to said load resource;

a resource manager adapted to establish and control a queue to control access to said load resource in response to receiving said queue position request signal; and a load manager located on said loading machine, said load manager being adapted to determine a first loadpoint for a mobile machine in a first queue position, said first load point being a function of a load resource configuration and a condition of said loading machine.

UNITED STATES PATENT AND TRADEMARK OFFICE
CERTIFICATE OF CORRECTION

PATENT : 5,925,081

DATED : 7/20/99

INVENTOR(S) : Hawkins et al.

It is certified that error appears in the above-identified patent and that said Letters Patent is hereby corrected as shown below:

11. A system, as set forth in claim 1, wherein said resource manager is adapted to receive a load point ready signal, said load point ready signal including said load point.

21. A method for managing a load resource shared by at least one mobile machine, said load resource having a loading machine, an entry point, and an exit point, the method including the steps of:

establishing and controlling a queue to control access to said load resource; and determining a load point for a mobile machine in a first queue position, said load point being a function of a load resource configuration and a condition of said loading machine.

Signed and Sealed this

Twenty-sixth Day of September, 2000

Attest:

Q. TODD DICKINSON

*Attesting Officer*    *Director of Patents and Trademarks*